United States Patent
Troupos et al.

(10) Patent No.: US 6,505,733 B2
(45) Date of Patent: Jan. 14, 2003

(54) RIGHT ANGLE POWER TRANSFER

(75) Inventors: Chris A. Troupos, Kentwood, MI (US); Ryan Ranschaert, Grand Rapids, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 21 days.

(21) Appl. No.: 09/760,275

(22) Filed: Jan. 12, 2001

(65) Prior Publication Data

US 2002/0092734 A1 Jul. 18, 2002

(51) Int. Cl.[7] ................................................. B65G 37/00
(52) U.S. Cl. ........................ 198/809; 198/817; 198/597; 198/840
(58) Field of Search ................................ 198/597, 509, 198/817, 840

(56) References Cited

U.S. PATENT DOCUMENTS

| | | | |
|---|---|---|---|
| 1,980,261 A | 11/1934 | Fenton | 80/44 |
| 3,026,988 A | 3/1962 | Fisk | 198/24 |
| 3,045,801 A | 7/1962 | Graybeal | 198/24 |
| 3,086,640 A * | 4/1963 | Verrinder | 198/809 |
| 3,246,733 A | 4/1966 | Torbet et al. | 198/185 |
| 3,465,870 A | 9/1969 | Paulsen | 198/188 |
| 3,621,973 A * | 11/1971 | Carlson | 198/809 |
| 4,174,774 A * | 11/1979 | Bourgeois | 198/413 |
| 4,264,002 A | 4/1981 | Van Der Schie | 198/365 |
| 4,298,117 A | 11/1981 | Xobayashi et al. | 198/367 |
| 4,441,604 A | 4/1984 | Schlig et al. | 198/598 |
| 4,643,291 A | 2/1987 | Counter et al. | 198/356 |
| 4,730,718 A | 3/1988 | Fazio et al. | 198/372 |
| 4,798,275 A * | 1/1989 | Leemkuil et al. | 198/372 |
| 4,820,143 A * | 4/1989 | Eroskey et al. | 425/122 |
| 4,880,099 A * | 11/1989 | Leemkuil et al. | 198/372 |
| 4,926,999 A * | 5/1990 | Fauth, Sr. et al. | 198/372 |
| 4,962,841 A | 10/1990 | Kloosterhouse | 198/372 |
| 5,010,998 A | 4/1991 | MacMillan | 198/372 |
| 5,217,104 A | 6/1993 | Pelletier | 198/367 |
| 5,219,063 A * | 6/1993 | Wyatt | 198/840 |
| 5,452,786 A | 9/1995 | Gilmore | 198/367 |
| 5,743,375 A * | 4/1998 | Shyr et al. | 198/809 |
| 6,068,105 A | 5/2000 | Darwish et al. | 198/370.02 |
| 6,216,847 B1 | 4/2001 | Schmidt | 198/463.3 |
| 6,343,685 B1 * | 2/2002 | Hofer | 198/370.09 |

FOREIGN PATENT DOCUMENTS

| | | |
|---|---|---|
| DE | 2242457 | 4/1973 |
| DE | 2620036 | 11/1977 |
| JP | 5836820 | 3/1983 |
| JP | 60232320 | 11/1985 |

* cited by examiner

*Primary Examiner*—Douglas Hess
(74) *Attorney, Agent, or Firm*—Van Dyke, Gardner, Linn & Burkhart, LLP

(57) ABSTRACT

A transfer assembly for a conveyor system includes a frame, a plurality of rollers mounted to the frame, a plurality of grooved transfer sheaves supported by the frame, and an actuator which selectively moves a group of the transfer conveyors between a retracted position and an extended position such that the transfer belt which is carried by the transfer sheaves is moved between a position below the conveying surface to a position above the conveying surface for lifting an article being conveyed on the rollers and transferring the article in a transfer direction. At least one of the transfer belt and the transfer sheaves are adapted to resist rolling of the transfer belt in the transfer sheaves when the transfer belt is subject to a lateral force from the article being transferred.

55 Claims, 10 Drawing Sheets

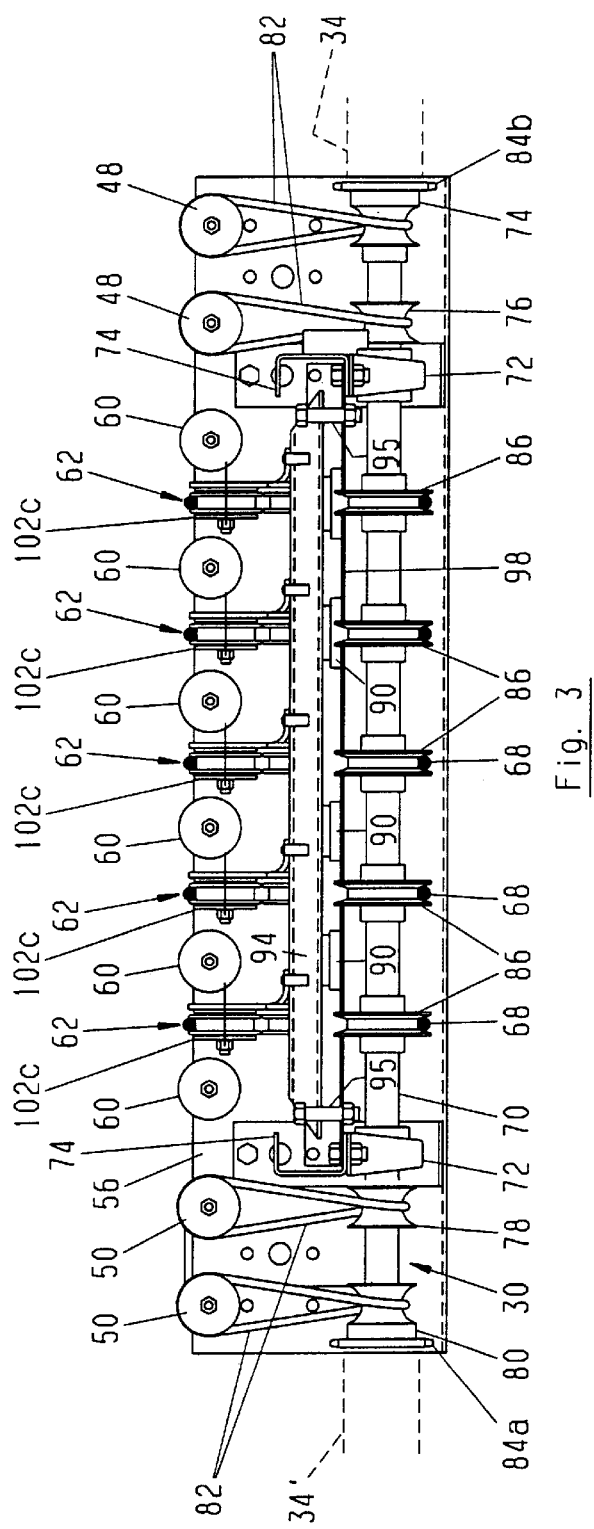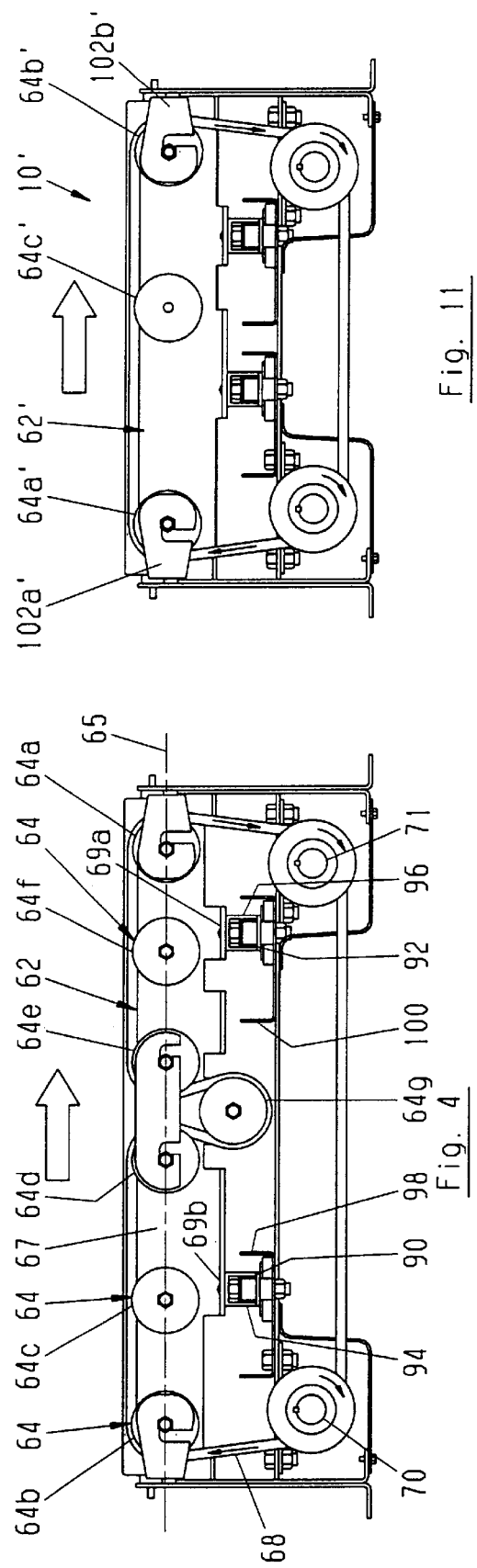

POSITION AT DISCHARGE END SHEAVE

POSITION AT CHARGE END SHEAVE

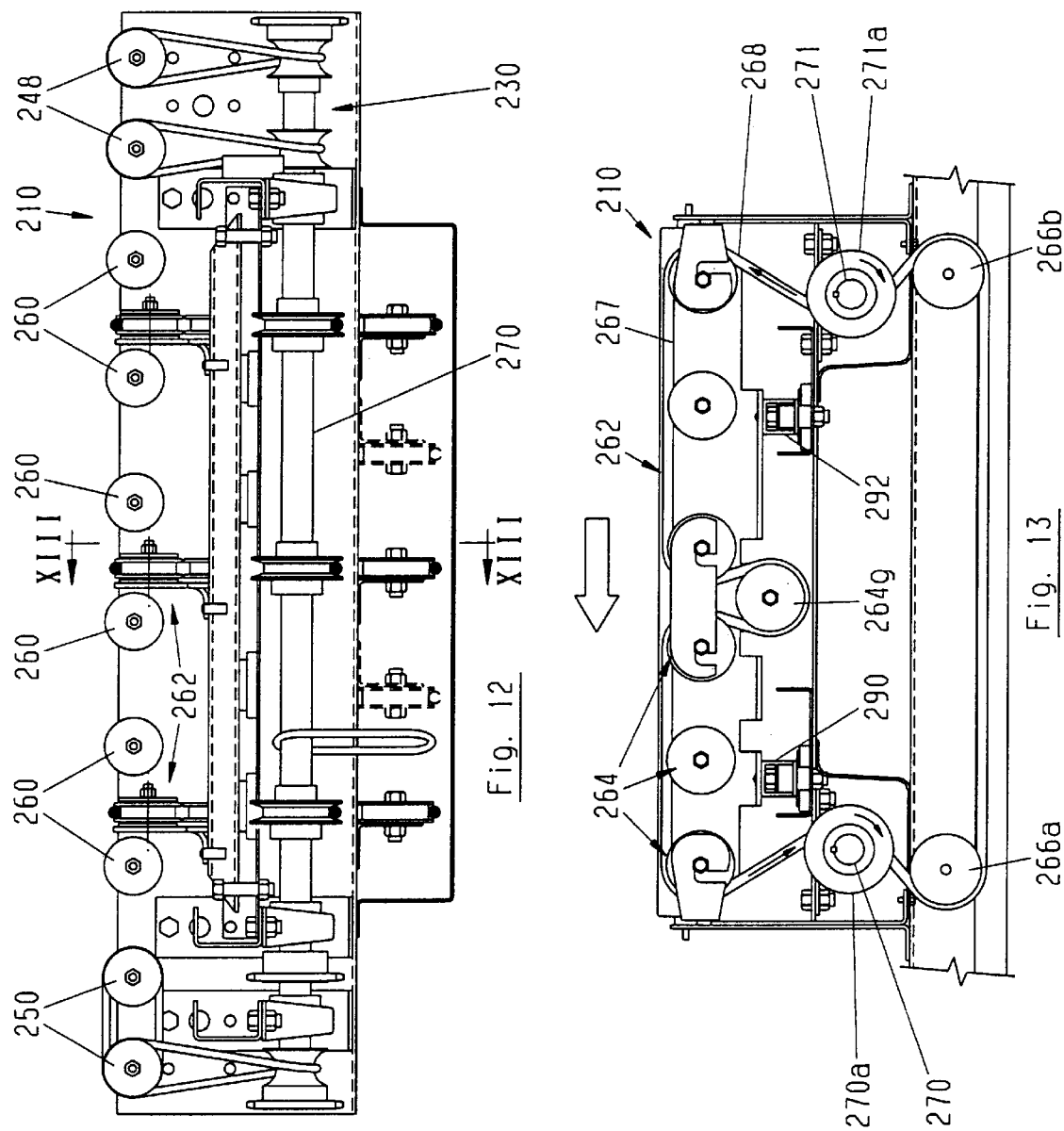

RIGHT ANGLE POWER TRANSFER

TECHNICAL FIELD AND BACKGROUND OF THE INVENTION

The present invention relates to a transfer assembly and, more particularly, to a transfer assembly for transferring articles, such as boxes or the like, from a conveyor.

Transfer assemblies are typically positioned between two conveyor sections and adjacent one or two transfer conveyors for selectively transferring articles from one of the conveyor sections to one of the transfer conveyors. Transfer assemblies typically transport conveyed products 90° with respect to the conveying direction of the conveyor and preferably achieve this in as little a space as possible. As an article or product is conveyed in a conveying direction across the conveyor, the transfer assembly (when actuated) diverts the product from the conveying direction to the transfer direction, which is, as noted above, typically 90° to the conveying direction.

Conventional transfer assemblies include a plurality of rollers and a plurality of grooved sheaves, which are positioned between the respective rollers. The sheaves are oriented in a direction orthogonal to the conveying direction of the rollers and are often driven by the main line drive shaft of the adjacent conveyor sections. Extending around the groove sheaves are transfer belts, which are positioned by the groove sheaves between the rollers just below the conveying surface of the rollers. When a transfer is to take place, a group of the grooved sheaves is raised such that the transfer belts positioned in the grooved sheaves are raised between the rollers to lift the articles on the rollers off the rollers and to transfer them at right angles with respect to the rollers so that the articles can be deposited on one of the adjacent transfer conveyors. It should be understood that the term "90°" or "right angle" includes clockwise and counterclockwise 90° directions.

In most applications, the transfer belts are raised under the article while the article is still moving. Since the article is moving at right angles to the transfer belt, the article induces lateral forces in the transfer belts. Typically, the transfer belts stop the forward motion of the article while transferring it laterally to the transfer conveyor. Depending on the size of the article being transferred and/or the shape of the article being transferred, their may be a tendency when the transfer belts engage the article for the lateral forces to induce the transfer belts to roll out of their respective grooved sheaves which results in increased wear of the transfer belts.

Consequently, there is a need for a transfer assembly which will limit the transfer belts from rolling out of their respective transfer sheaves to thereby enhance the longevity of the transfer belts.

SUMMARY OF THE INVENTION

The present invention provides a transfer assembly for positioning between two conveyor sections and one or more adjacent transfer conveyors which exhibits greater retention of the transfer belt in the transfer sheaves of the transfer assembly resulting in an increased life expectancy for the transfer belt, while maintaining sufficient engagement with the articles being transferred to transfer the articles.

According to one form of the invention, a sheave assembly for a transfer assembly includes a support member, a transfer belt, and a plurality of grooved sheaves which are mounted to the support member. Each of the grooved sheaves has a groove, with the transfer sheaves supporting the transfer belt in the grooves of the respective transfer sheaves. The support member includes at least one retainer to laterally retain the transfer belt in the grooves of the transfer sheaves when the transfer belt is subject to a lateral force from an article being transferred by the transfer belt.

In one aspect, the retainer comprises a bracket, which is supported by the support member. For example, the bracket may comprise a generally U-shaped bracket which straddles a respective grooved sheave. In another aspect, the bracket is supported at a respective grooved transfer sheave to thereby retain the transfer sheave in the grooves of the transfer sheaves.

In another aspect, the support member includes a plurality of the retainers. For example, the support member may include two transfer sheaves at opposed ends of the support member to define end grooved transfer sheaves, with the retainers located at the end grooved transfer sheaves. In this aspect, the retainers comprise generally U-shaped members. In further aspects, the retainers are mounted to the support member. For example, each of the grooved transfer sheaves may be mounted to the support member by an axle pin with the retainers mounted to the axle pins of the respective grooved transfer sheaves to thereby mount the retainers to the support member. In a further aspect, the support member supports two of the grooved transfer sheaves at opposed ends of the support member to define end grooved transfer sheaves. The retainers are mounted to each of the axle pins of the end grooved transfer sheaves to define end retainers.

In yet a further aspect, each of the end retainers comprises a U-shaped member, which includes opposed facing side members. The opposed facing side members include mounting openings for receiving the axle pin of a respective end groove transfer sheave. At least one of the mounting openings of the opposed facing side members comprises an L-shaped slot. In preferred form, both of the mounting openings comprise L-shaped slots whereby the retainer can be installed after the respective end grooved transfer sheaves are mounted to the support member.

According to another form of the invention, a sheave assembly of a transfer assembly includes a support member, a transfer belt, and a plurality of grooved transfer sheaves. The grooved transfer sheaves are mounted to the support member, with the transfer sheaves supporting the transfer belt. The support member includes at least one bracket to laterally retain the transfer belt in the transfer sheaves when the transfer belt is subject to a lateral force from an article being transferred by the transfer belt.

In another aspect, a first pair of the grooved transfer sheaves are mounted to opposed ends of the support member to define end transfer sheaves. A second pair of the transfer sheaves are mounted to an intermediate portion of the support member to define intermediate transfer sheaves. Another transfer sheave is mounted to the support member at an intermediate portion of the support member, but which is offset from the intermediate transfer sheaves to define an offset sheave. The transfer belt extends over the end transfer sheaves and over the intermediate sheaves and around the offset sheave to thereby form a loop around the offset sheave.

In a further aspect, the support member includes at least two brackets, with one of the brackets being located at one of the end transfer sheaves to define an end bracket and another of the brackets being located at the intermediate sheaves to define an intermediate bracket to thereby retain the transfer belt in the grooved transfer sheaves. In yet a further aspect, the transfer sheaves are mounted to the support member by axle pins, with the intermediate bracket being mounted to the axle pin of a respective intermediate transfer sheave. The intermediate bracket comprises an elongate plate member having a pair of mounting openings for mounting to the axle pins of the intermediate transfer sheaves to thereby extend over the loop of the transfer belt and to laterally retain the transfer belt in the grooved transfer sheaves.

In another aspect, the end bracket comprises a U-shaped bracket which straddles the respective end transfer sheave.

According to yet another form of the invention, a transfer assembly for a conveyor system includes at least two conveying surfaces defining a conveying direction, a plurality of grooved transfer sheaves positioned between the conveying surfaces, and a transfer belt extending over the grooved transfer sheaves. At least one of the grooved transfer sheaves is driven and drives the transfer belt to move across the grooved transfer sheaves in a transfer direction non-parallel to the conveying direction. An actuator moves one of the conveying surface and the grooved transfer sheaves between a first position wherein the transfer belt is below the conveying surfaces to a second position wherein the transfer belt defines a transfer surface above the conveying surface for lifting an article being conveyed on the conveying surface and transferring the article in the transfer direction. The transfer assembly further includes a support member, with the grooved sheaves being mounted to the support member and the support member including at least one bracket to retain the transfer belt on the grooved transfer sheaves.

In one aspect, the bracket is positioned below the transfer surface of the transfer belt. In another aspect, the support member includes a plurality of brackets to retain the transfer belt in the grooved transfer sheaves. In a further aspect, the support member supports two of the grooved transfer sheaves at opposed ends of the support member to define end grooved sheaves and at least two other grooved sheaves at intermediate portions of the support member defining intermediate grooved transfer sheaves. The end grooved transfer sheaves and the intermediate grooved transfer sheaves are generally aligned along a common axis, with two of the brackets supported at the end grooved sheaves defining end brackets and another of the brackets supported at two of the intermediate grooved transfer sheaves to define an intermediate bracket.

In one aspect, portions of the support member form the end brackets. In another aspect, the brackets are mounted to the support member and may, for example, comprise generally U-shaped brackets.

The present invention provides an improved transfer assembly which exhibits increased retention of the transfer belt in the transfer sheaves of the transfer assembly, thus extending the life of the transfer belt.

These and other objects, advantages, purposes, and features of the invention will become more apparent from the study of the following description taken in conjunction with the drawings.

BRIEF DESCRIPTION OF THE DRAWINGS

FIG. 3 is a cross-section taken along line III—III of FIG. 2;

FIG. 4 is a cross-section taken along line IV—IV of FIG. 2;

FIG. 11 is a view similar to FIG. 4 of another embodiment of a transfer assembly of the present invention;

FIG. 12 is a similar view to FIG. 3 of another embodiment of a transfer assembly;

FIG. 13 is a similar view to FIG. 4 of the transfer assembly of FIG. 12;

DESCRIPTION OF THE PREFERRED EMBODIMENTS

Figure 1:
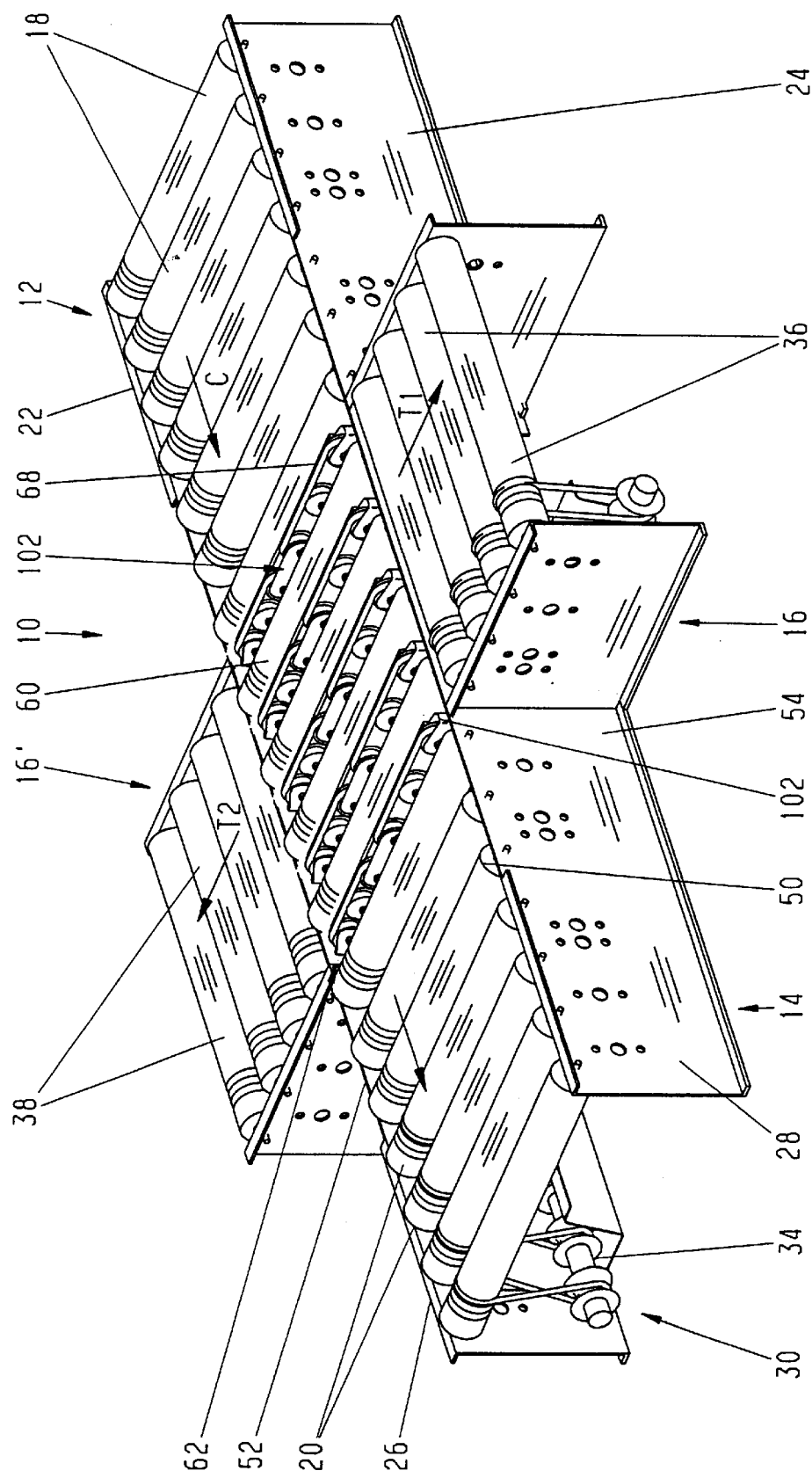
FIG. 1 is a perspective view of a conveyor system incorporating a left-handed orthogonal transfer assembly of the present invention.

Referring to FIG. 1, the numeral 10 generally designates a transfer assembly of the present invention which incorporates retainers 102 (FIGS. 5–8) to improve the retention of the transfer assembly's transfer belt 68, as will be more fully described below. In the illustrated embodiment, transfer assembly 10 is a left-handed orthogonal or right-angle power transfer assembly which is used for selectively transferring or diverting articles from a conveyor section, such as conveyor section 12 to a transfer conveyor, such as transfer conveyor 16. As best seen in FIG. 1, transfer assembly 10 is positioned between two conveyor sections 12 and 14 and adjacent one or more transfer conveyors 16, 16'. In the illustrated embodiment, conveyor sections 12, 14 comprise roller conveyors and respectively include a plurality of rollers 18, 20 and support frame members, 22, 24, 26, and 28, respectively, which support rollers 18, 20. Rollers 18, 20 are driven by a belt drive system 30 and define a conveying surface and a conveying direction indicated by the arrow C in FIG. 1.

In the illustrated embodiment, conveyor sections 12 and 14 comprise line shaft conveyor sections and include a common drive shaft 34 which drives rollers 18, 20 of conveyor section 12 and conveyor section 14 in a conveying direction indicated by the arrow C (FIG. 1) through transfer assembly 10. In this manner, transfer assembly 10 may be driven by drive shaft 34. As will be more fully described below, drive shaft 34 does not extend from 12 to 14 but instead comprises a section of a composite drive shaft with a portion of the composite drive shaft driving the transfer assembly. It should be understood that the present invention may be used with other forms of rollers, such as direct belt or padded train driven rollers or motorized rollers. Furthermore, the transfer assembly may be used in conjunction with non-roller conveyors, such as belt conveyors or the like.

Each transfer conveyor 16, 16' similarly includes a plurality of rollers 36, 38, which are respectively mounted between side frame members 42a, 42b, and 44a, 44b. Rollers 36 define a second conveying surface and a first transfer conveying direction indicated by the arrow T1 in FIG. 1 which is generally orthogonal to the conveying direction of conveyor sections 12 and 14. In a similar manner, rollers 38 of conveyor 16' define a third conveying surface in a second transfer direction indicated by the arrow T2 in FIG. 1, which is similarly orthogonal to the conveying direction of conveyor sections 12, 14.

Figure 2:
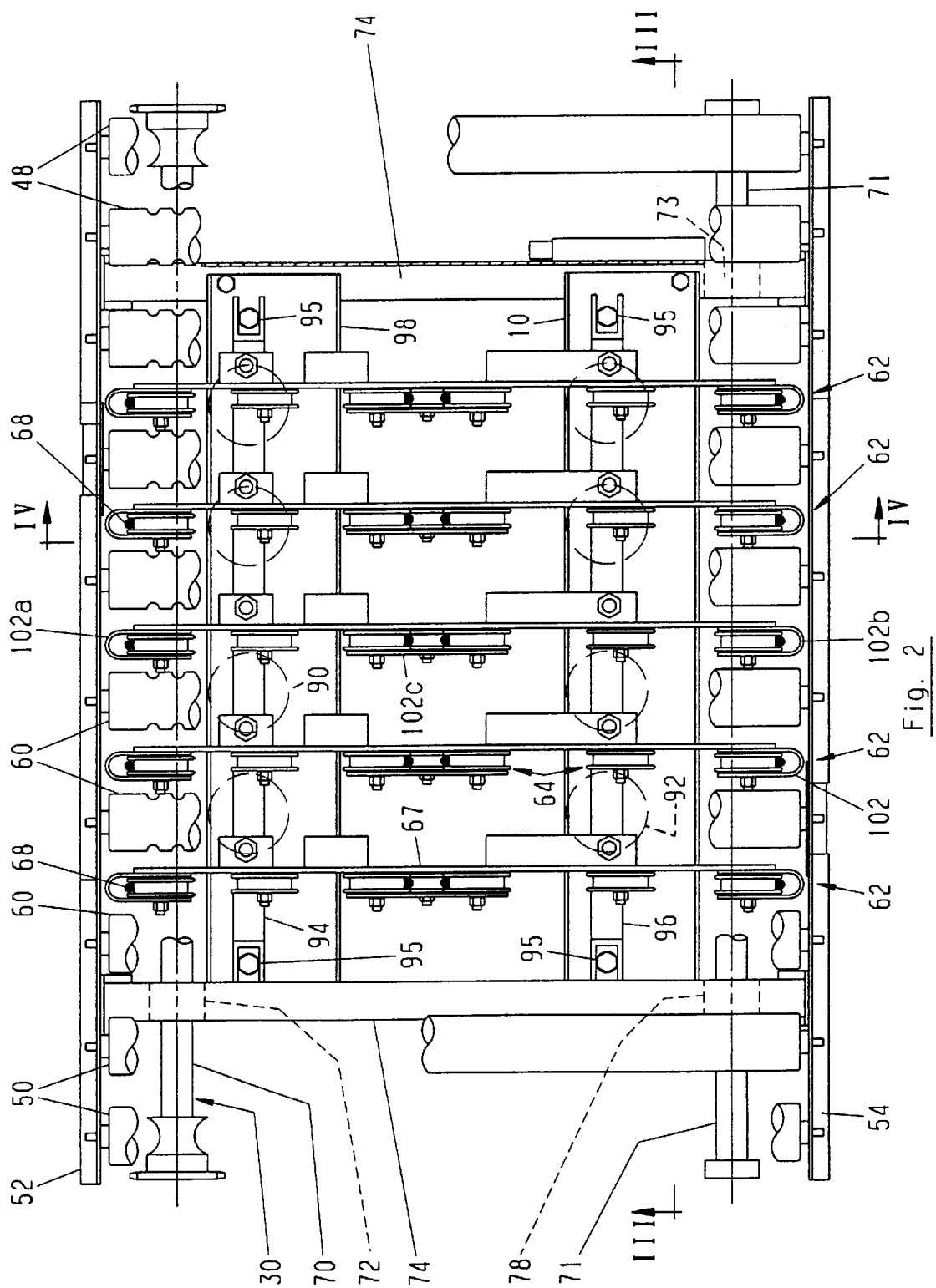
FIG. 2 is an enlarged plan view of the transfer assembly of FIG. 1.

Referring to FIG. 2, transfer assembly 10 includes a plurality of input or charge rollers 48, a plurality of output or discharge rollers 50, and a plurality of intermediate rollers 60, which are rotatably supported between frame members 52 and 54. Frame members 52 and 54 preferably abut and are optionally coupled to frame members 22, 24 and 26, 28 of conveyor sections 12 and 14 (FIG. 1). In this manner, each set of rollers 48, 50, and 60 define conveying surfaces which are generally coplanar with the conveying surfaces of rollers 18 and 20 of conveyor sections 12 and 14. It should be understood, that terms input and output are being used merely as a convention to indicate direction with respect to the illustrated embodiment and in no way are intended to limit the scope of the invention.

Referring to FIG. 3, input rollers and output rollers 48, 50 are preferably driven rollers and are driven by belt drive system 30. Optionally and typically, intermediate rollers 60 comprise idler rollers. Depending on the application, the number of input rollers, output rollers, and idler rollers may be increased or decreased. Again referring to FIG. 3, positioned between intermediate rollers 60 are transfer sheave assemblies 62. As will be more fully described below, in the illustrated embodiment, transfer assemblies 62 are raised when a transfer is to take place so that a package conveyed on the conveying surfaces of the respective rollers may be lifted off the conveying surface and transferred laterally so that the package or packages can be moved and deposited on, for example, conveyor section 16. It should be understood, however, that rollers 60 may be lowered instead, as would be understood by those skilled in the art.

Referring to FIGS. 3 and 4, each transfer sheave assembly 62 includes a plurality of grooved transfer sheaves 64. Sheaves 64 are commonly mounted on a support member 67 and are arranged such that end transfer sheaves 64a and 64b are mounted at opposed ends of support member 67 and a plurality of intermediate transfer sheaves 64c, 64d, 64e, and 64f, which are mounted to support member 67 between end sheaves 64a and 64b along a common axis 65. Extending over transfer sheaves 64 is a transfer belt 68. In the illustrated embodiment, transfer belt 68 comprises a round transfer belt and preferably comprises a polyurethane transfer belt. Thus, when transfer sheave assemblies 62 are raised, belt 68 will contact the underside of the conveyed articles to thereby lift the conveyed article off the conveying surfaces of rollers 60 and move it laterally with respect to the conveyed direction.

As described above, input and output rollers 48 and 50 are preferably driven rollers. Referring to FIGS. 3 and 4, in the illustrated embodiment, transfer assembly 10 includes a transverse drive shaft 70 which is supported between side frame members 52 and 54 by bearings, for example bearing blocks 72. Mounted to axle 70 are spools 74, 76, 78, and 80 which are in turn drivingly coupled to input and output rollers 48, 50, respectively, by drive belts 82. In addition, positioned at both ends of shaft 70 are conventional couplings 84a and 84b, which couple to drive shafts 34, 34' of conveyor sections 12 and 14. In this manner, drive shafts 34 and 34' and drive shaft 70 form a composite drive shaft that drives rollers 18 and 20 and rollers 48, 50, and 60. In addition, shaft 70 includes a plurality of drive pulleys or sheaves 86, which are coupled to shaft 70, such as by a key way or the like, such that drive pulleys 86 rotate with shaft 70. Transfer assembly 10 further includes a second shaft 71 (FIG. 4) which is spaced from drive shaft 70 and is similarly rotatably supported between side frame members 52 and 54 by bearings, such as bearing blocks 73, FIG. 2) similar to bearing blocks 72. Shaft 71 includes a plurality of sheaves or pulleys 88. As best seen in FIG. 3, bearing blocks 72, 73 are mounted to cross-frame members 74, which extend transversely between side frame members 52 and 54 and are mounted thereto by fasteners, or the like, to thereby form a frame with side frame members 52 and 54 for transfer assembly 10. Since both ends of shaft 71 are free to rotate, shaft 71 forms an idler shaft. Referring again to FIG. 4, each transfer belt 68 extends over transfer sheaves 64, around a respective drive pulley 86, and around a respective idler pulley 88 to form a close loop. Thus, when drive shaft 70 rotates, transfer belt 68 moves to the right (as viewed in FIG. 4) over transfer sheaves 64 to define a transfer surface for transferring articles, as described above.

In order to raise transfer sheave assemblies 62 to engage transfer belt 68 with the articles being conveyed along the conveying surface, transfer assembly 10 includes a plurality of actuators 90, 92 (FIG. 4) which lift and lower support 67 to thereby raise and lower sheaves 64 and, further, transfer belt 68. Actuators 90, 92 may for example comprise pneumatic actuators, hydraulic actuators, or the like. For suitable electric actuators, reference is made to U.S. co-pending provisional Pat. application entitled CONVEYOR TRANSFER LIFT BOX, filed Oct. 16, 2000, Ser. No. 60/240,798, by Ricardo Schiesser, which is incorporated by reference in its entirety herein. Referring again to FIG. 4, transfer sheave assemblies 62 are commonly mounted on a pair of supports 94, 96. Actuators 90 and 92 are supported on a pair of transverse supports 98 and 100, which are respectively mounted to transverse frame members 74 (FIG. 2) such that supports 98 and 100 are fixed and stationary. Supports 94 and 96, on the other hand, are movably mounted to transverse supports 98 and 100 on pins 95 such that when actuators 90, 92 are activated to extend, supports 94 and 96 move upwardly to thereby move sheave assemblies 62 upwardly to position transfer belts 68 such that their outer surfaces (which define transfer conveying surfaces) are positioned above the respective conveying surfaces of rollers 60. It can be appreciated from the foregoing description, since axle 70 is coupled to drive axles 34 and 34' of conveyor section 12 and 14, transfer belt 68 is continuously moving.

Figure 5:
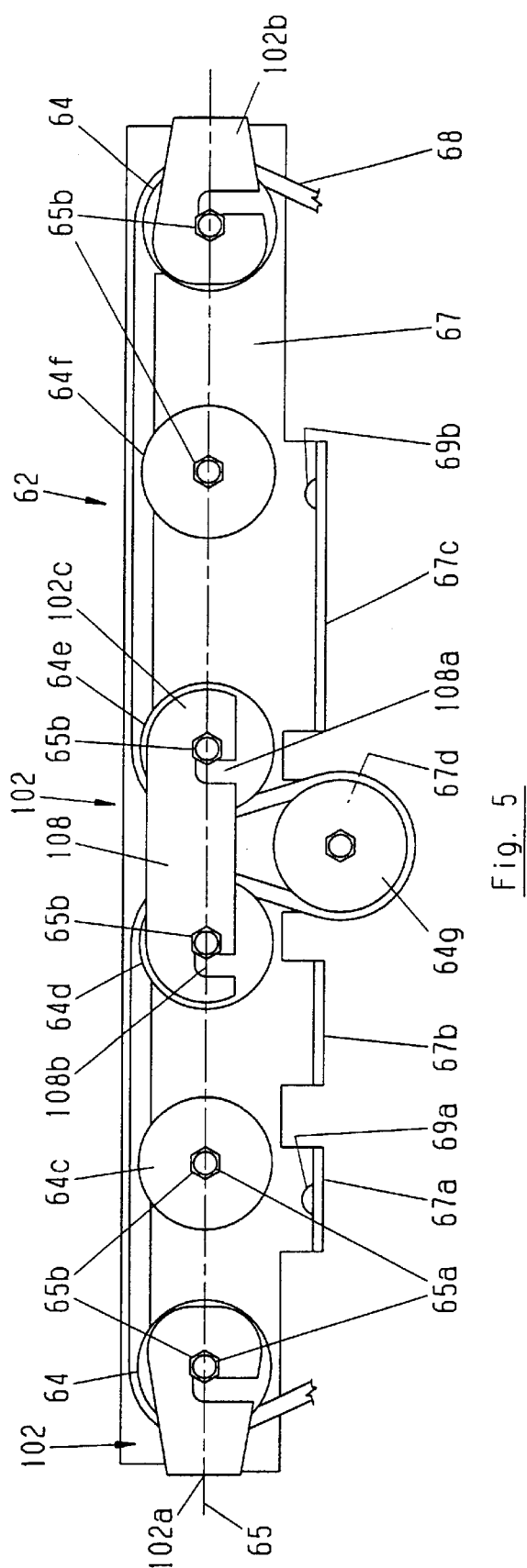
FIG. 5 is an enlarged side elevation view of a sheave assembly of the transfer assembly of FIG. 4.

As best seen in FIG. 5, each transfer sheave assembly 62 includes as one of its intermediate sheaves a snubber or take-up sheave 64g, which is similarly mounted to support member 67. Snubber sheave 64g is positioned between intermediate sheaves 64d and 64e and offset below axis 65 such that when transfer belt 68 extends over intermediate sheave 64e and around take-up sheave 64g and back over intermediate sheave 64d, transfer belt 68 forms a loop 68a thereby forming two transfer conveying surfaces 68b and. 68c for each transfer belt. By reducing the unsupported length of belt 68, belt 68 can carry heavier articles, as would be understood by those skilled in the art.

Figure 6:
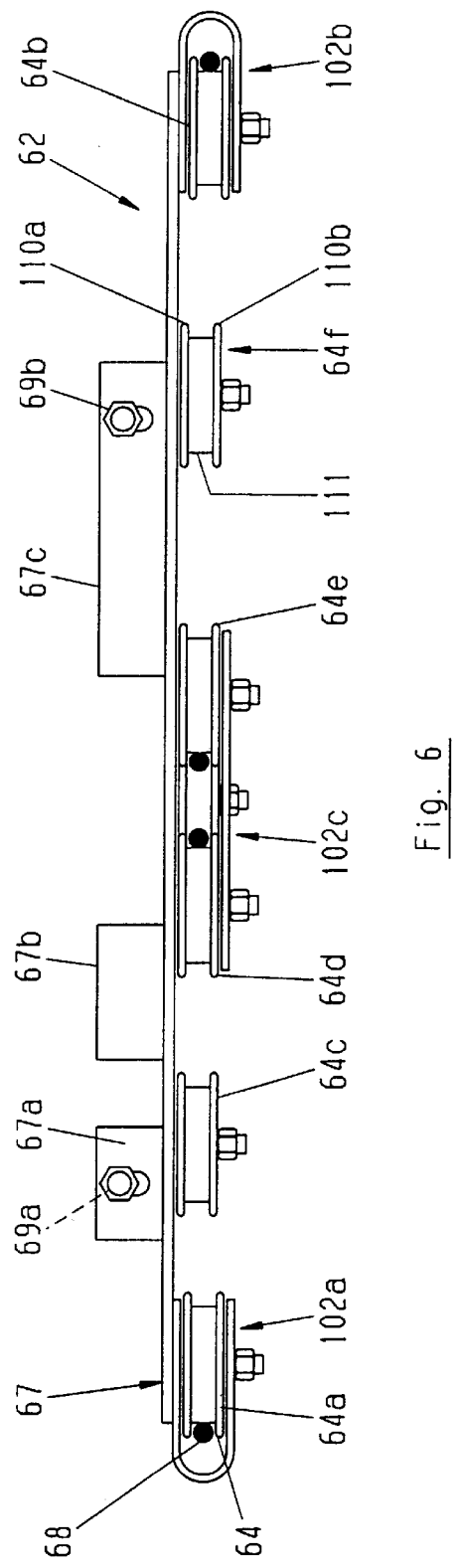
FIG. 6 is a plan view of the sheave assembly of FIG. 5.

Referring to FIGS. 5 and 6, support member 67 comprise elongate plate member with a plurality of flanges 67a, 67b, 67c, and 67d. Flanges 67a and 67c include mounting openings 69a and 69b for securing support member 67 to transverse support members 94 and 96. Flange 67d forms a mounting flange for take-up sheave 64g and optionally may include a slotted mounting opening to provide for adjustment of take-up sheave 64g so that the tension in transfer belt 68 may be adjusted.

Figure 8A:
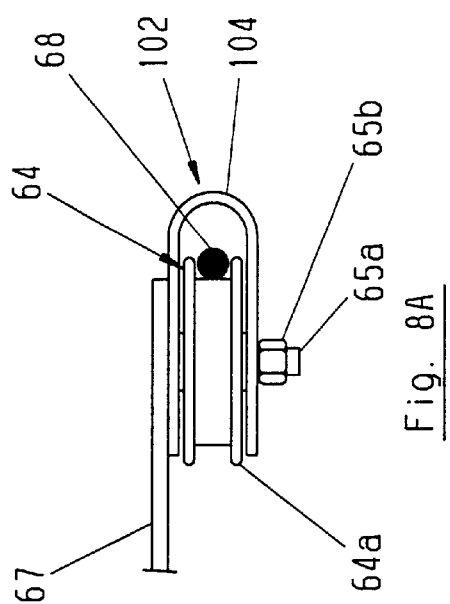
FIG. 8A is a plan view of the end retaining bracket of FIG. 8.
Figure 8B:
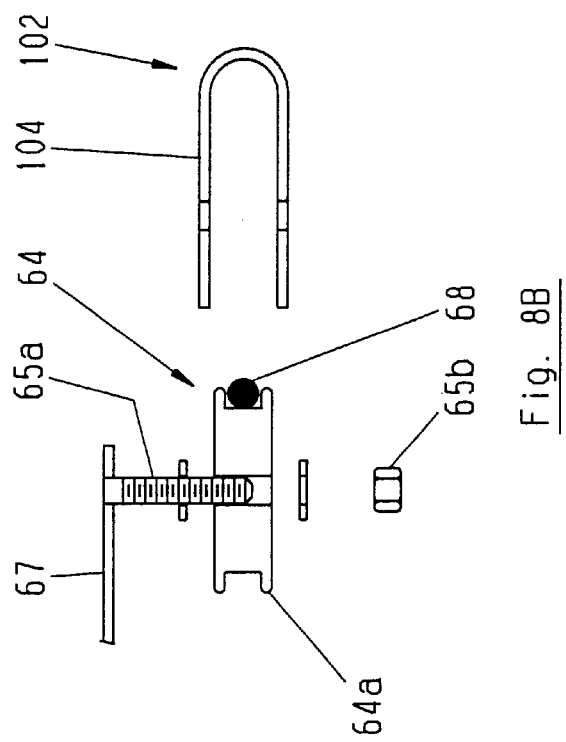
FIG. 8B is an exploded plan view of the end bracket of FIG. 8A.
Figure 1A:
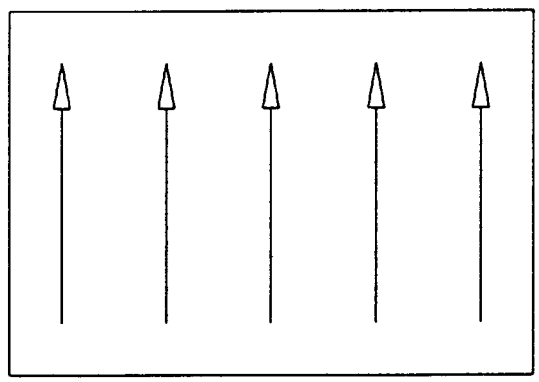
FIG. 1A is a schematic diagram of the transfer assembly of FIG. 1.
Figure 15A:
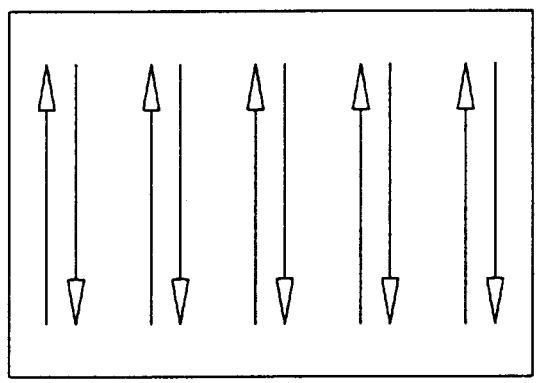
FIG. 15A is a schematic diagram of the transfer assembly of FIG. 15.
Figure 8:
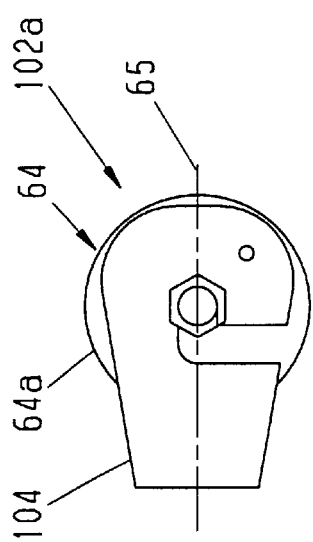
FIG. 8 is an enlarged elevation view of an end retaining bracket of a charge end sheave of the sheave assembly of FIGS. 5 and 6.

Again referring to FIG. 5, as previously noted transfer assembly 10 includes one or more retainers 102 to minimize the lateral movement of transfer belt 68 in sheaves 64 and thereby improve the retention of transfer belt 68 in sheaves 64. As a result, the wear and tear of belt 68 in significantly reduced. In the illustrated embodiment, support member 67 includes charge and discharge end retainers 102a and 102b at opposed ends of support member 67 adjacent charge and discharge end transfer sheaves 64a and 64b. In addition, support member 67 includes an intermediate retainer 102c which straddles intermediate transfer sheaves 64d and 64e and thereby extends over a portion of loop 68a to assist in retaining transfer belt 68 in sheaves 64. As best seen in FIGS. 6 and 8, charge end retainer 102a comprises a U-shaped member or bracket 104 with opposed facing sides 104a and 104b. Each side 104a, 104b includes a mounting opening 106a and 106b, respectively. In preferred form, at least one of the mounting openings 106a, 106b comprises an L-shaped slot and, more preferably, both openings 106a, 106b comprise L-shaped slots such that the U-shaped member may be post-mounted to sheave assembly 62.

Referring again to FIGS. 8A and 8B, each sheave 64 is mounted to support member 67 on an axle pin 65a and is secured on its respective axle pin 65a by a bolt 65b. In order to permit free rotation of sheave 64, one or more washers are positioned between sheave 64 and support member 67 and between sheave 64 and nut 65b. As will be understood by those skilled in the art, with U-shaped member 104 having a pair of L-shaped slotted mounting openings, U-shaped member 104 may be mounted onto sheave 64a by simply loosening nut 65b. Similarly, discharge end retainer 102b comprises a U-shaped member or bracket 104' which is substantially identical to U-shaped member or bracket 104 and which is mounted to end transfer sheave 64b. In this manner, a single part may be used for both end retainers. However, it should be understood that brackets 104 and 104' do not have to be identical.

Figure 9:
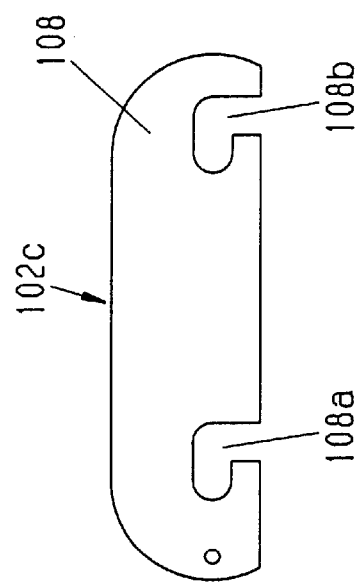
FIG. 9 is a side elevation view of an intermediate retaining bracket of FIG. 7.

Referring to FIG. 9, intermediate retainer 102c comprises an elongate plate member 108 with a pair of spaced apart mounting openings 108a and 108b. In order to facilitate installation of retainer 102c without the need to remove respective transfer sheaves 64d and 64e, preferably each mounting opening 108a, 108b comprises L-shaped slot. In this manner, bolt 65b, which mounts respective transfer sheaves 64d and 64e to support member 67, need only be loosened in order to mount retainer 102c over the axle pins 65a of sheaves 64d and 64e.

Again referring to FIG. 6, each sheave 64 includes a pair of opposed facing sides 110a and 110b, which define therebetween a groove 111. In the illustrated embodiment, groove 111 has a cross-section that is generally rectangular. It should be understood that the shape of the cross-section of groove 111 may be varied, however. As best understood from FIG. 6, when transfer belts 68 are driven and sheave assemblies 62 move to their extended positions, objects or articles that are transferred urge transfer belt 68 to roll out of grooves 111. However, retainers 102, which are positioned below the transfer surface formed by the respective transfer belt 68, provide guides to limit the lateral movement of transfer belt 68 in its respective sheaves 64. In this manner, when belts 68 are subjected to loads which tend to dislodge transfer belts 68, belts 68 will roll against retainers 102 and in so doing rebound and return into their grooves 111 of sheaves 64. Furthermore, as retainers 102 are rigidly mounted to sheave assembly 10, retainers 102 will maintain their positions so as not to degrade over time.

Figure 7:
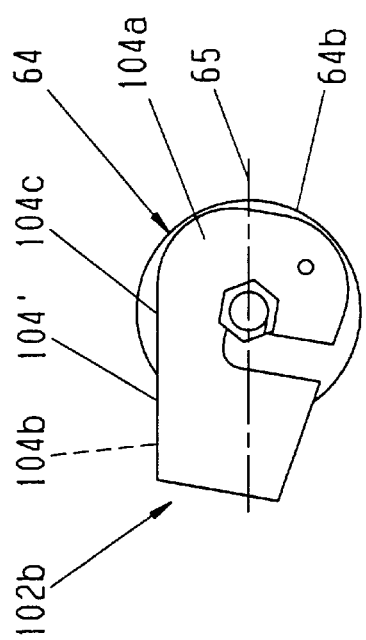
FIG. 7 is an enlarged elevation view of an end retaining bracket at a discharge end sheave of the sheave assembly of FIGS. 5 and 6.

Referring to FIG. 7, discharge end retainer 104' is angled upwardly with respect to sheave axis 65 at an angle in a range of 0° to 15°. However, the uppermost portions of upper edges 104c of sides 104a and 104b are positioned beneath the conveying surface of the respective transfer belts so as not to interfere with the transfer of the articles. Furthermore, opposed facing sides 104a and 104b are tapered so that minor rotation of retainer 102 will not cause the uppermost surface of the retainer to extend above the conveying surface of the transfer belt and yet still will provide retention of the respective belt 68 in sheaves 64.

Referring to FIGS. 4 and 8, charge end retainer 102a is mounted to charge end sheave 64a such that U-shaped bracket 104 is generally aligned along axis 65. Referring to FIGS. 4 and 7, discharge end retainer 102b on discharge sheave 69a is angled upward to keep belt 68 securely positioned on sheave 69a. The angle of retainer 102b is dictated by the belt's path and direction. The belt's forward movement increases the likelihood that belt 68 will slip off or jump off the discharge end sheave.

Figure 6A:
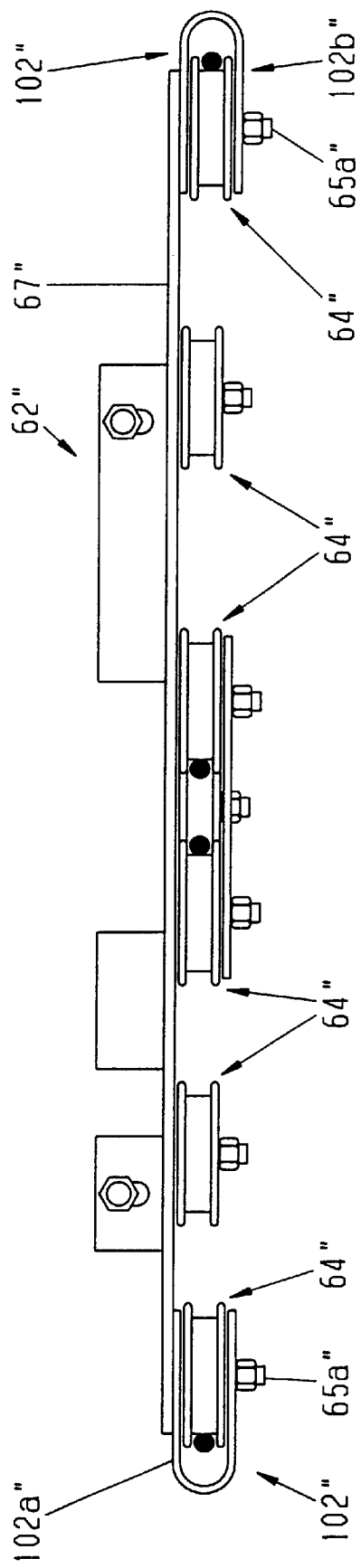
FIG. 6A is a plan view of another embodiment of a sheave assembly of the present invention.

It should be understood that the number of sheaves 64 on transfer sheave assembly 62 may be varied. For example, referring to FIG. 11, transfer sheave assembly 10' includes sheave assemblies 62' with two end sheaves 64a' and 64b' and a single intermediate sheave 64c'. As best seen in FIG. 11, each transfer assembly 62' includes a pair of retainers 102a' and 102b'. Retainer 102a' comprises a charge end retainer, while retainer 102b' comprises a discharge end retainer. For further details of retainers 102a' and 102b', reference is made to the previous embodiment. Such a transfer sheave arrangement may be more suitable for narrower conveyors, for example for conveyors having widths on the order of 18 inches. In contrast, transfer assembly 10 may be more suitable for larger conveyor widths, such as 24 inches or greater. As will be understood by those skilled in the art, the wider the conveyor, the required number of sheaves increases in order to provide adequate support to the transfer belt. In addition, the retainers may be formed as a part of the support member. For example, referring to FIG. 6A, sheave assembly 62" includes a support member 67" with one or more retainers 102", such as end retainers 102a" and 102b", integrally formed with support member 67", for example either during the forming process of support member 67" or by welding. Though not removable, retainers 102" are particularly suitable for new installations. In this manner, axle pins 65a" are inserted through support member 67" after the respective sheave 64" is positioned in the end retainers (102a" and 102b").

Referring to FIG. 12, a second embodiment 210 of the transfer assembly of the present invention is illustrated. In the illustrated embodiment, transfer assembly 210 comprises a right-handed, orthogonal or right-angle transfer assembly. Transfer assembly 210 is of similar construction to transfer assembly 10 and includes a plurality of input rollers 248, output rollers 250, and intermediate rollers 260. Input rollers and output rollers 248, 250 are driven rollers and are driven by a belt drive system 230 similar to drive system 30 of the previous embodiment. Intermediate rollers 260 comprise idler rollers, also similar to the previous embodiment. For further details of drive system 230, reference is made to drive system 30.

Positioned between intermediate rollers 260 are a plurality of transfer sheave assemblies 262, which are selectively moved to transfer articles being conveyed across the conveying surfaces of rollers 248, 250, and 260 and move the articles laterally with respect to the conveying surface so that the articles can be deposited, for example, on an adjacent transfer conveyor, such as conveyor 16' illustrated in FIG. 1.

Referring to FIG. 13, transfer assemblies 262 are of similar construction to transfer assembly 62 and include a plurality of transfer sheaves 264 which are mounted on a transfer support member 267. Extending around sheaves 264 of each transfer assembly is a transfer belt 268 similar to transfer belt 68. As described in reference to the previous embodiments, when transfer assembly 262 is raised by, for example actuators 290 and 292, transfer belt 268 extends above the conveying surface of the respective rollers 248, 260, and 250 to thereby engage the underside of the respective conveyed article so that the article can be transferred laterally with respect to the conveying surface.

In the illustrated embodiment, transfer assembly 210 transfers the articles from right to left (as viewed in FIG. 13) in contrast to transfer assembly 10. In preferred form, transfer belt 268 is driven by the respective drive shafts of the adjacent conveyor sections. However, in order to drive belt 268 in the opposite direction from transfer assembly 10, transfer assembly 210 includes a pair of redirection pulleys 266a and 266b. Redirection pulleys 266a, 266b are supported on lower transverse members 269, which are in turn mounted flanges 252a and 254a of side frame members 252 and 254, respectively. Similar to the previous embodiment, transfer assembly 210 includes a drive shaft 270, which drivingly couples to the respective drive shafts of the adjacent conveyor sections, such as drive shafts 34, 34' of conveyor sections 12 and 14. Each belt 268 extends over its respective transfer sheaves 264, including a take-up sheave pulley 264g, and, further, around a drive pulley 270a, which is mounted on and keyed to drive shaft 270. Each belt 268 further extends around redirection pulleys 266a and 266b and around an idler pulley 271a mounted to an idler shaft 271. In this manner, when drive shaft 270 rotates in a clockwise direction, transfer belt 268 moves in a counter-clockwise direction over the respective sheaves and/or pulleys.

In addition, transfer assembly 210 includes a transfer assembly 262 between every other roller 260 as compared to between each roller 60, as in the case of the first embodiment. As it would be appreciated by those skilled in the art, the number of transfer sheave assemblies may be increased or decreased depending on the desired load capacity of the transfer assembly.

Figure 14:
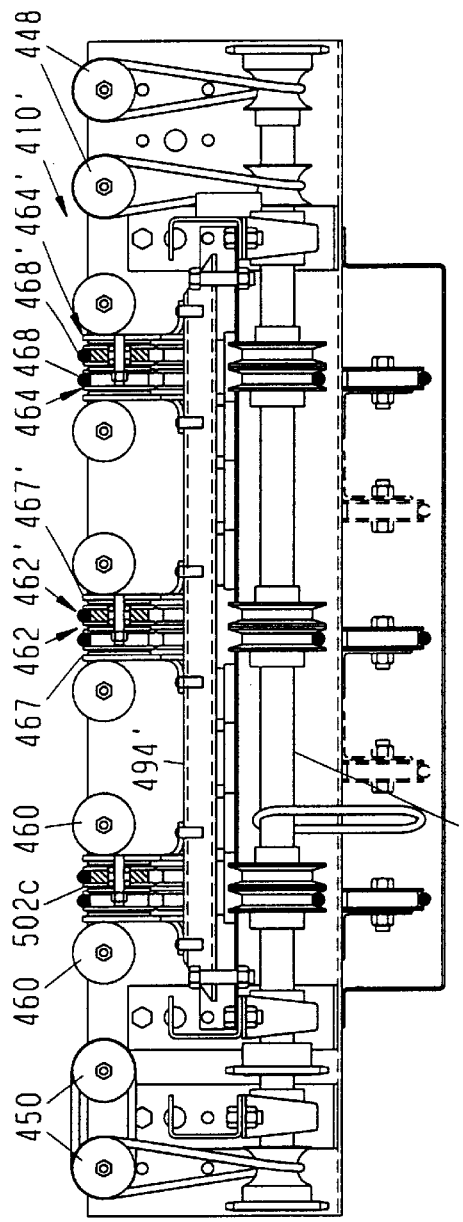
FIG. 14 is a similar view to FIG. 3 of a fourth embodiment of the transfer assembly of the present invention.

Referring to FIG. 14, the numeral 410 generally designates another embodiment of the transfer assembly of the present invention. Transfer assembly 410 comprises a left and right-handed, orthogonal or right-angle transfer assembly. Similar to the previous embodiments, transfer assembly includes a plurality of input or charge rollers 448 and a plurality of output or discharge rollers 450, with a plurality of intermediate rollers 460 positioned between input and output rollers 448, 450. Positioned between every other set of intermediate rollers 460 are a pair of transfer sheaves 462 and 462'. Transfer sheave assembly 462 is of similar construction to transfer sheave 162, while transfer sheave assembly 462' is of similar construction to transfer sheave 62. In this manner, transfer sheaves 462 transfers articles to the right, while transfer sheave assemblies 462' transfer articles to the left (as viewed in FIG. 15).

Transfer sheave assembly 462' includes a plurality of grooved transfer sheaves 464' mounted on a common support member 467' which is mounted on a pair of transverse support members 494' and 496' which in turn are supported on frame members 498 and 500. Positioned between transverse members 494' and 496' and support frame members 498 and 500 are actuators 490' and 492', which extend and contract to raise or lower the respective transfer sheave assembly 462'. Similarly, transfer sheave assembly 462 includes a plurality of grooved transfer sheaves 464, which are mounted on a common support member 467. Support member 467 is similarly mounted on a pair of transverse support members 494 and 496, which are commonly mounted with support members 494' and 496' on frame support members 498 and 500. In a similar manner, transfer sheave assemblies 462 are moved by a plurality of actuators 490 and 492 which are positioned between transverse members 494, 496 and frame support members 498 and 500. As would be understood, when actuators 490 and 492 extend, transfer sheave assemblies 462 move to an extended position whereby their respective transfer belts 468 are moved to engage a lower-most surface of the articles to be transferred in a similar manner to the previous embodiments.

Figure 15:
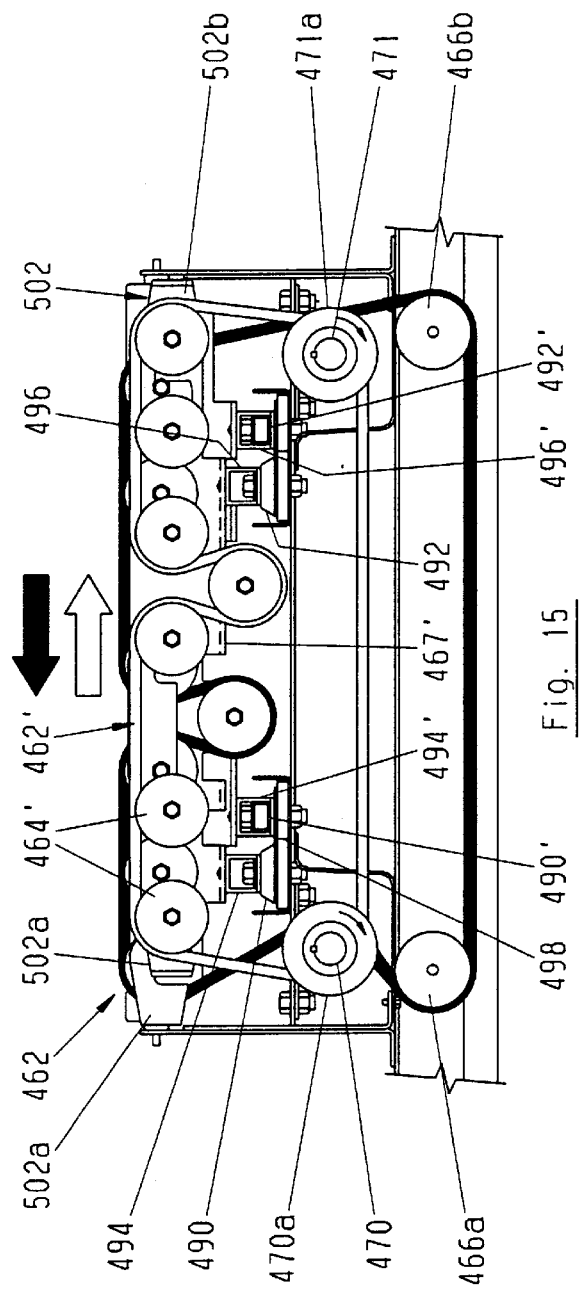
FIG. 15 is a similar view to FIG. 4 of the transfer assembly of FIG. 14.
Figure 16:
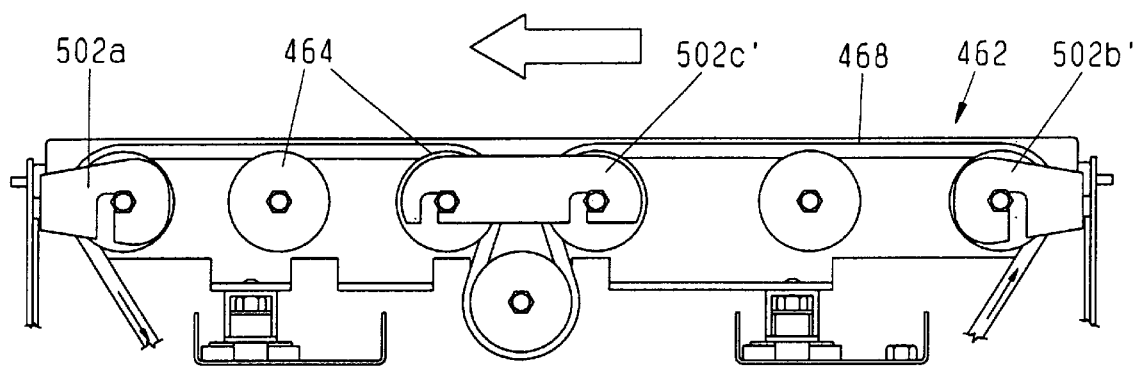
FIG. 16 is an enlarged elevation of one of the sheave assemblies of FIG. 15.
Figure 17:
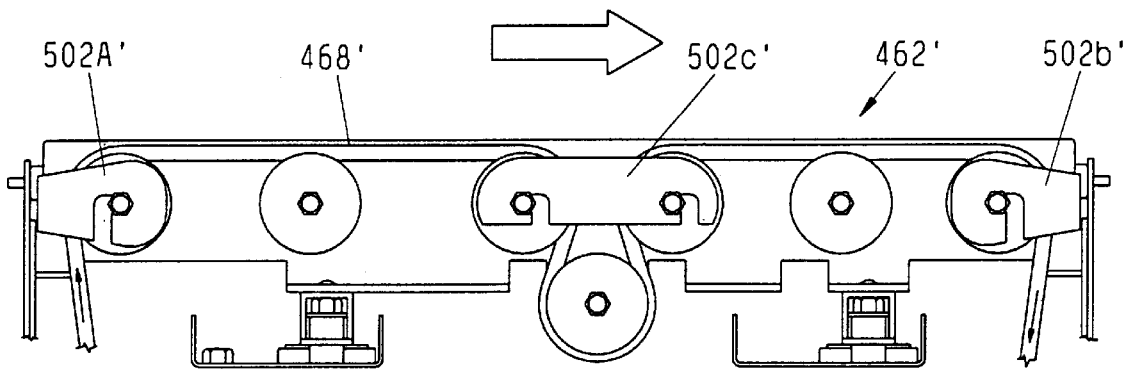
FIG. 17 is an enlarged elevation of another sheave assembly of FIG. 15.

Preferably, each transfer sheave assembly 462, 462' includes one or more retainers 502, to retain the respective transfer belt 468 and 468' in their respective transfer sheaves 464 and 464'. Referring to FIGS. 15, 16, and 17, each transfer assembly 462 and 462' includes a pair of end retainers 502a, 502b and 502a', 502b' and an intermediate retainer 502c, 502c'. End retainers 502a and 502a' are of similar construction to retainers 102a described in reference to the first embodiment. Similarly, end retainers 502b and 502b' are of similar construction to retainers 102b. While intermediate retainer 502c is preferably similar to retainer 102c, retainer 502c' may be modified as described below.

Figure 10:
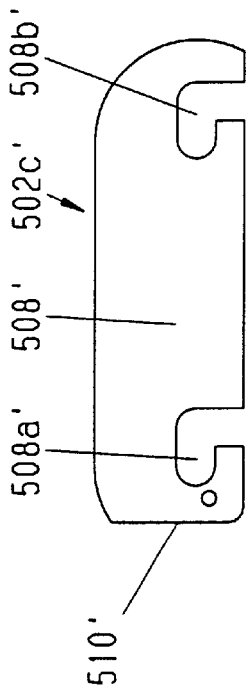
FIG. 10 is an enlarged side elevation view of a modified intermediate retaining bracket.

Depending on the relative proximity of sheave transfer assemblies 462 and 462', it may be desirable to modify one or more of the intermediate retainers 502c or 502c' on transfer assemblies 462, 462' so that the intermediate retainers do not contact or cause an interference. Referring to FIG. 10, retainer 502c' includes an elongate plate member 508' with a pair of spaced apart openings 508a' and 508b', similar to retainer 102c. As noted in reference to the previous embodiment, it is preferable that both openings 508a' and 508b' comprise L-shaped slotted openings to facilitate installation of retainer 502c' on the respective intermediate transfer sheaves of the transfer assembly without removal of the transfer sheaves. Depending on the width of transfer sheave assembly 410, it may be necessary to shorten elongate plate 508' (as shown in FIG. 10) so that the respective intermediate retainers 502c and 502c' of transfer assemblies 462 and 462' will not create an interference, as will be understood by those skilled in the art.

While several forms of the invention have been shown and described, other forms will now be apparent to those skilled in the art. As previously noted, the conveying surface of the transfer assembly may be lowered instead of raising the transfer belts. In addition, the member of sheaves, sheave assemblies, and rollers, may be increased or decreased as desired. Furthermore, two concepts of this invention may also be used on a non-round belt application. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

We claim:

1. A sheave assembly of a transfer assembly, said transfer assembly for transferring one or more articles laterally with respect to a conveying surface, said sheave assembly comprising:

a support member;

a transfer belt;

a plurality of grooved transfer sheaves mounted to said support member, each of said grooved transfer sheaves having a groove, said transfer sheaves supporting said transfer belt in said grooves, said transfer belt defining a transfer conveying surface, and said support member including at least one retainer, said retainer straddling at least one of said grooved transfer sheaves to laterally retain said transfer belt in said grooves of said transfer sheaves when said transfer belt is subject to a lateral force from an article being transferred by said transfer belt.

2. The sheave assembly according to claim 1, wherein said transfer belt comprises a round transfer belt.

3. The sheave assembly according to claim 2, wherein said grooves of said transfer sheaves have a substantially rectangular cross-section.

4. The sheave assembly according to claim 1, wherein said retainer comprises a bracket, said bracket being supported by said support member.

5. The sheave assembly according to claim 4, wherein said bracket comprises a generally U-shaped bracket.

6. The sheave assembly according to claim 4, wherein said bracket is supported at a respective grooved transfer sheave to thereby retain the transfer belt in said grooves of said transfer sheaves.

7. The sheave assembly according to claim 1, wherein said support member includes a plurality of said retainers, said retainers retaining said transfer belt in said grooves of said transfer sheaves.

8. The sheave assembly according to claim 7, wherein said support member supports two of said grooved transfer sheaves at opposed ends of said support member defining end grooved transfer sheaves, said retainers located at said end grooved transfer sheaves.

9. The sheave assembly according to claim 8, wherein said retainers comprise generally U-shaped members.

10. The sheave assembly according to claim 7, wherein portions of said support member form said retainers.

11. The sheave assembly according to claim 7, wherein said retainers are mounted to said support member.

12. The sheave assembly according to claim 11, wherein each of said grooved transfer sheaves is mounted to said support member by an axle pin, and said retainers are mounted to said axle pins of respective grooved transfer sheaves to thereby mount said retainers to said support member.

13. The sheave assembly according to claim 12, wherein said support member supports two of said grooved transfer sheaves at opposed ends of said support member defining end grooved transfer sheaves, said respective retainers comprising end retainers and being mounted to said axle pins of said end grooved transfer sheaves.

14. The sheave assembly according to claim 7, wherein said support member supports two of said grooved transfer sheaves at opposed ends of said support member defining end grooved transfer sheaves and at least two other of said grooved transfer sheaves at intermediate portions of said support member defining intermediate grooved transfer sheaves, two of said retainers supported at said end grooved transfer sheaves defining end retainers, and another of said retainers supported at least one of said intermediate grooved transfer sheaves defining an intermediate retainer.

15. The sheave assembly according to claim 14, wherein portions of said support member form said end retainers.

16. The sheave assembly according to claim 14, wherein said retaining members are mounted to said support member.

17. The sheave assembly according to claim 16, wherein said end retainers comprise generally U-shaped members.

18. The sheave assembly according to claim 14, wherein said intermediate retainer is mounted to a pair of said intermediate grooved transfer sheaves.

19. The sheave assembly according to claim 18, wherein said intermediate retainer member comprises an elongate member having a pair of mounting openings for mounting said intermediate retainer member to axle pins of said pair of intermediate transfer sheaves.

20. A sheave assembly of a transfer assembly, said transfer assembly for transferring one or more articles laterally with respect to a conveying surface, said sheave assembly comprising:

a support member;

a transfer belt; and a plurality of grooved transfer sheaves mounted to said support member, each of said grooved transfer sheaves having a groove, said transfer sheaves supporting said transfer belt in said grooves, said transfer belt defining a transfer conveying surface, and said support member including a plurality of retainers to laterally retain said transfer belt in said grooves of said transfer sheaves when said transfer belt is subject to a lateral force from an article being transferred by said transfer belt, said retainers being mounted to said support member, each of said grooved transfer sheaves being mounted to said support member by an axle pin, said retainers being mounted to said axle pins of respective grooved transfer sheaves to thereby mount said retainers to said support member, said support member supporting two of said grooved transfer sheaves at opposed ends of said,support member defining end groove sheaves, said respective retainers comprising end retainers and being mounted to said axle pins of said end grooved transfer sheaves wherein said end retainers straddle said end grooved transfer sheaves.

21. The sheave assembly according to claim 20, wherein each of said end retainers comprises a U-shaped member including opposed facing side members, said opposed facing side members each including a mounting opening for receiving said axle pin of a respective end grooved transfer sheave.

22. The sheave assembly according to claim 21, wherein at least one of said mounting openings comprises an L-shaped slot.

23. The sheave assembly according to claim 22, wherein both of said mounting openings comprise L-shaped slots whereby said U-shaped member can be installed after said respective end grooved transfer sheaves are mounted to said support member.

24. A sheave assembly of a transfer assembly, said transfer assembly for transferring one or more articles laterally with respect to a conveying surface, said sheave assembly comprising:
   a support member;
   a transfer belt; and
   a plurality of grooved transfer sheaves mounted to said support member, each of said grooved transfer sheaves having a groove, said transfer sheaves supporting said transfer belt in said grooves, said transfer belt defining a transfer conveying surface, and said support member including a plurality of retainers to laterally retain said transfer belt in said grooves of said transfer sheaves when said transfer belt is subject to a lateral force from an article being transferred by said transfer belt, said support member supporting two of said grooved transfer sheaves at opposed ends of said support member defining end grooved transfer sheaves and at least two other of said grooved transfer sheaves at intermediate portions of said support member defining intermediate grooved transfer sheaves, two of said retainers supported at said end grooved transfer sheaves defining end retainers, and another of said retainers supported at least one of said intermediate grooved transfer sheaves defining an intermediate retainer, said retaining members being mounted to said support member, said end retainers comprising generally U-shaped members wherein said generally U-shaped members include opposed facing side members, and said opposed facing side members each including an opening for mounting said end retainers to said support member.

25. The sheave assembly according to claim 24, wherein each of said grooved transfer sheaves is mounted to said support member by an axle pin, and said retainers are mounted to said axle pins of respective grooved transfer sheaves to thereby mount said retainers to said support member.

26. The sheave assembly according to claim 25, wherein said end retainers straddle said end grooved transfer sheaves.

27. A sheave assembly of a transfer assembly, said transfer assembly for transferring one or more articles laterally with respect to a conveying surface, said sheave assembly comprising:
   a support member;
   a transfer belt; and
   a plurality of grooved transfer sheaves mounted to said support member, each of said grooved transfer sheaves having a groove, said transfer sheaves supporting said transfer belt in said grooves, said transfer belt defining a transfer conveying surface, and said support member including a plurality of retainers to laterally retain said transfer belt in said grooves of said transfer sheaves when said transfer belt is subject to a lateral force from an article being transferred by said transfer belt, said support member supporting two of said grooved transfer sheaves at opposed ends of said support member defining end grooved transfer sheaves and at least two other of said grooved transfer sheaves at intermediate portions of said support member defining intermediate grooved transfer sheaves, two of said retainers supported at said end grooved transfer sheaves defining end retainers, and another of said retainers supported at least one of said intermediate grooved transfer sheaves defining an intermediate retainer, said intermediate retainer being mounted to a pair of said intermediate grooved transfer sheaves, said intermediate retainer member comprising an elongate member having a pair of mounting openings for mounting said intermediate retainer member to axle pins of said pair of intermediate transfer sheaves wherein at least one of said mounting openings comprises an L-shaped slot to provide adjustment of said intermediate retaining member on said axle pins.

28. The sheave assembly according to claim 27, wherein each of said mounting openings comprise L-shaped slots.

29. A sheave assembly of a transfer assembly, said transfer assembly for transferring one or more articles laterally with respect to a conveying surface, said sheave assembly comprising:
   a support member;
   a transfer belt; and
   a plurality of grooved transfer sheaves mounted to said support member, said transfer sheaves supporting said transfer belt, and said support member including at least one bracket, said bracket including portions straddling at least one of said grooved transfer sheaves to laterally retain said transfer belt in said transfer sheaves when said transfer belt is subject to a lateral force from an article being transferred by said transfer belt.

30. The sheave assembly according to claim 29, wherein a first pair of said grooved transfer sheaves are mounted to opposed ends of said support member to define end transfer sheaves, and a second pair of said transfer sheaves are mounted to an intermediate portion of said support member to define intermediate transfer sheaves, and another of said transfer sheaves being mounted to said support member at an intermediate portion of said support member offset from said intermediate transfer sheaves to define an offset sheave, and said transfer belt extending over said end transfer sheaves and over said intermediate sheaves and around said offset sheave to thereby form a loop around said offset sheave.

31. The sheave assembly according to claim 30, wherein said support member includes at least two of said brackets, one of said brackets being located at one of said end transfer sheaves to define an end bracket, and another of said brackets being located at said intermediate sheaves to define an intermediate bracket to thereby retain said transfer belt in said grooved transfer sheaves.

32. The sheave assembly according to claim 31, wherein each of said transfer sheaves is mounted to said support member by an axle pin, said intermediate bracket being mounted to said axle pins of said intermediate transfer sheaves.

33. The sheave assembly according to claim 32, wherein said intermediate bracket comprises an elongate plate member having a pair of mounting openings for mounting to said axle pins of said intermediate transfer sheaves to thereby extend over said loop of said transfer belt to laterally retain said transfer belt in said grooved transfer sheaves when said transfer belt is subject to a lateral force from an article being transferred by said transfer belt.

34. The sheave assembly according to claim 32, wherein said end brackets comprise generally U-shaped brackets.

35. The sheave assembly according to claim 29, wherein said transfer belt comprises a round transfer belt.

36. The sheave assembly according to claim 29, wherein said transfer belt comprises a polyurethane transfer belt.

37. A sheave assembly of a transfer assembly, said transfer assembly for transferring one or more articles laterally with respect to a conveying surface, said sheave assembly comprising:

a support member;

a transfer belt; and a plurality of grooved transfer sheaves mounted to said support member, said transfer sheaves supporting said transfer belt, and said support member including at least two brackets to laterally retain said transfer belt in said transfer sheaves when said transfer belt is subject to a lateral force from an article being transferred by said transfer belt, a first pair of said grooved transfer sheaves being mounted to opposed ends of said support member to define end transfer sheaves, and a second pair of said transfer sheaves are mounted to an intermediate portion of said support member to define intermediate transfer sheaves, and another of said transfer sheaves being mounted to said support member at an intermediate portion of said support member offset from said intermediate transfer sheaves to define an offset sheave, and said transfer belt extending over said end transfer sheaves and over said intermediate sheaves and around said offset sheave to thereby form a loop around said offset sheave, one of said brackets being located at one of said end transfer sheaves to define an end bracket, and another of said brackets being located at said intermediate sheaves to define an intermediate bracket to thereby retain said transfer belt in said grooved transfer sheaves, each of said transfer sheaves being mounted to said support member by an axle pin, said intermediate bracket being mounted to said axle pins of said intermediate transfer sheaves, and said end brackets comprising generally U-shaped brackets wherein said generally U-shaped brackets straddle said end transfer sheaves.

38. The sheave assembly according to claim 37, wherein each of said U-shaped bracket includes a mounting portion and a guide portion, said mounting portion having rounded corners.

39. The sheave assembly according to claim 38, wherein said guide portion is tapered with respect to said mounting portion.

40. The sheave assembly according to claim 38, wherein said mounting portion includes mounting openings for mounting said end brackets to said axle pins of said end transfer sheaves.

41. The sheave assembly according to claim 40, wherein said mounting openings comprise L-shaped slots.

42. A transfer assembly for a conveyor system, said transfer assembly comprising:

at least two conveying surfaces defining a conveying direction;

a plurality of grooved transfer sheaves positioned between said conveying surfaces;

a transfer belt extending over said grooved transfer sheaves;

at least one of said grooved transfer sheaves being driven and driving said transfer belt to move across said grooved transfer sheaves in a transfer direction non-parallel to said conveying direction;

an actuator moving one of said conveying surface and said grooved transfer sheaves between a first position wherein said transfer belt is below said conveying surface to a second position wherein said transfer belt defines a transfer surface above said conveying surface for lifting an article being conveyed on said conveying surface and transferring the article in said transfer direction; and a support member, said grooved transfer sheaves being mounted to said support member, and said support member including at least one bracket straddling at least one of said grooved transfer sheaves to retain said transfer belt on said grooved transfer sheaves.

43. The transfer assembly according to claim 42, wherein said bracket is positioned below said transfer surface.

44. The transfer assembly according to claim 42, wherein said support includes a plurality of brackets to retain said transfer belt in said grooved transfer sheaves.

45. The transfer assembly according to claim 44, wherein said brackets are positioned below said transfer surface to avoid interference with the articles being transferred.

46. The transfer assembly according to claim 45, wherein said support members supports two of said grooved transfer sheaves at opposed ends of said support member defining end grooved sheaves and at least two other of said grooved sheaves at intermediate portions of said support member defining intermediate grooved transfer sheaves, said end grooved transfer sheaves and said intermediate grooved transfer sheaves being generally aligned along a common axis, two of said brackets supported at said end grooved sheaves defining end brackets, and another of said brackets supported at least one of said intermediate grooved transfer sheaves defining an intermediate bracket.

47. The transfer assembly according to claim 46, wherein portions of said support member form said end brackets.

48. The transfer assembly according to claim 46, wherein said brackets are mounted to said support member.

49. The transfer assembly according to claim 46, wherein said end brackets comprises generally U-shaped brackets.

50. The transfer assembly according to claim 49, wherein said grooved transfer sheaves are mounted to said support member by axle pins, said brackets being mounted to said axle pins of respected grooved transfer sheaves to thereby mount said bracket to said support member.

51. The transfer assembly according to claim 42, wherein said transfer direction comprises a first transfer direction, a first group of said plurality of grooved sheaves being driven in said first transfer direction, and a second group of said plurality of grooved transfer sheaves being driven in a second transfer direction opposed from said first transfer direction to thereby provide transfer of the article in one of said first transfer direction and said second transfer direction.

52. A transfer assembly for a conveyor system, said transfer assembly comprising:

at least two conveying surfaces defining a conveying direction;

a plurality of grooved transfer sheaves positioned between said conveying surfaces;

a transfer belt extending over said grooved transfer sheaves;

at least one of said grooved transfer sheaves being driven and driving said transfer belt to move across said grooved transfer sheaves in a transfer direction non-parallel to said conveying direction;

an actuator moving one of said conveying surface and said grooved transfer sheaves between a first position wherein said transfer belt is below said conveying surface to a second position wherein said transfer belt defines a transfer surface above said conveying surface for lifting an article being conveyed on said conveying surface and transferring the article in said transfer direction; and a support member, said grooved transfer sheaves being mounted to said support member, and said support member including a plurality of brackets to retain said transfer belt on said grooved transfer sheaves, said brackets being positioned below said transfer surface to avoid interference with the articles being transferred, said support members supporting two of said grooved transfer sheaves at opposed ends of said support member defining end grooved sheaves and at least two other of said grooved sheaves at intermediate portions of said support member defining intermediate grooved transfer sheaves, said end grooved transfer sheaves and said intermediate grooved transfer sheaves being generally aligned along a common axis, two of said brackets supported at said end grooved sheaves defining end brackets, and another of said brackets supported at least one of said intermediate grooved transfer sheaves defining an intermediate bracket, said end brackets comprising generally U-shaped brackets, said grooved transfer sheaves being mounted to said support member by axle pins, said brackets being mounted to said axle pins of respected grooved transfer sheaves to thereby mount said bracket to said support member wherein said end bracket straddle said end grooved sheaves.

53. The transfer assembly according to claim 52, wherein said brackets include mounting openings for mounting said brackets to axle pins of said respective transfer sheaves.

54. The transfer assembly according to claim 50, wherein at least one of said mounting openings comprises an L-shaped slot to provide adjustment of said bracket on said axle pins.

55. The transfer assembly according to claim 54, wherein each of said mounting openings comprise L-shaped slots.

* * * * *

UNITED STATES PATENT AND TRADEMARK OFFICE
CERTIFICATE OF CORRECTION

PATENT NO. : 6,505,733 B2  Page 1 of 1
APPLICATION NO. : 09/760275
DATED : January 14, 2003
INVENTOR(S) : Troupos et al.

It is certified that error appears in the above-identified patent and that said Letters Patent is hereby corrected as shown below:

Column 7:
Line 9, Delete --.-- after "and".

Column 8:
Line 61, "intergrally" should be --integrally--.

Column 12:
Line 15, Claim 14, Insert --at-- before "at least".

Column 13:
Line 27, Claim 24, Insert --at-- before "least".
Line 66, Claim 27, Insert --at-- before "least".

Column 16:
Line 22, Claim 46, Insert --at-- before "at least".

Column 17:
Line 13, Claim 52, Insert --at-- before "at least".

Signed and Sealed this

Fifteenth Day of August, 2006

JON W. DUDAS
*Director of the United States Patent and Trademark Office*